United States Patent [19]

Wolf

[11] 4,296,186
[45] Oct. 20, 1981

[54] TWO PART PRESSURE RELIEF VALVE

[76] Inventor: Franz J. Wolf, Bad Soden-Salmunster, Fed. Rep. of Germany

[21] Appl. No.: 57,358

[22] Filed: Jul. 13, 1979

Related U.S. Application Data

[63] Continuation of Ser. No. 715,463, Aug. 18, 1976, abandoned.

[51] Int. Cl.³ .................. B65D 51/16; F16K 15/14; H01M 2/12
[52] U.S. Cl. ........................ 429/54; 137/539; 137/DIG. 4; 220/203; 361/433
[58] Field of Search .............. 137/DIG. 4, 539; 220/203, 208, 209; 361/433; 429/53, 54, 55

[56] References Cited
U.S. PATENT DOCUMENTS

| | | | |
|---|---|---|---|
| 1,997,955 | 4/1935 | Weaver | 137/DIG. 4 |
| 2,147,153 | 2/1939 | Crowley | 137/DIG. 4 |
| 2,601,133 | 6/1952 | Yardeny | 429/54 |
| 2,797,703 | 7/1957 | Edwards | 137/539 |
| 3,257,237 | 6/1966 | Jache | 429/54 |
| 3,669,302 | 6/1972 | Markarian | 361/433 X |
| 3,688,162 | 8/1972 | Willy et al. | 361/433 |
| 3,831,629 | 8/1974 | Mackal et al. | 137/DIG. 4 |
| 3,935,030 | 1/1976 | Sperandio | 220/209 X |
| 3,948,414 | 4/1976 | Hagerty | 220/203 |
| 3,952,233 | 4/1976 | Deckert | 429/54 X |
| 3,980,500 | 9/1976 | Sorenson et al. | 429/55 X |
| 4,047,790 | 9/1977 | Carino | 361/433 X |

FOREIGN PATENT DOCUMENTS

| | | |
|---|---|---|
| 2321166 | 11/1974 | Fed. Rep. of Germany . |
| 2341375 | 2/1975 | Fed. Rep. of Germany . |
| 43-24821 | 5/1968 | Japan .................. 429/54 |

Primary Examiner—Irwin C. Cohen
Attorney, Agent, or Firm—Irvin A. Lavine

[57] ABSTRACT

A pressure relief valve is provided having only two parts, a housing and a valve body located in a chamber in the housing. In a first embodiment, the housing has a deformable elastic, stressed wall opposite the valve seat, with a rigid valve body engaging the wall and the valve seat in closed condition. In a second embodiment, the housing is rigid and the valve body is of deformable, elastic material and is stressed when in position in the housing, engaging the wall and the valve seat in closed condition. The valve body is preferably spherical, the height perpendicular to the plane of the valve seat being at least about 75% of the width, parallel to the valve seat. The housing of the first embodiment may be of metal, such as sheet steel, or of plastic. Plastic housings which are elastically deformable may be injection molded directly into an opening in a container part, or may be separately molded and then secured in the opening of a container part. Alternatively, the plastic housing may be rigid and molded integrally with and as a part of a container part.

7 Claims, 5 Drawing Figures

TWO PART PRESSURE RELIEF VALVE

This is a continuation of application Ser. No. 715,463 filed Aug. 18, 1976, now abandoned.

There are provided methods of making two part pressure relief valves as above described, including broadly the forming of the housing and of the valve body, then inserting the valve body into a chamber in the housing through a restricted opening with elastic deformation of either the housing or the valve body.

The invention relates to a two part pressure relief valve, a process for its manufacture, and its application.

Pressure relief valves consist of three functional components: the valve seat, the valve body, and an element which urges the valve body in the closing direction.

Numerous pressure relief valves are known in which these three functional components are made as three individual elements: for example, the valve seat is made in the form of an opening with a conical profile, the valve body is made in the form of a fitted ball or a fitted cone, and the urging of the valve body is produced by means of a pressure spring or a tension spring. The manufacture and assembly of such automatically opening and closing pressure relief valves is financially and technically costly, but such costs are usually unavoidable in the case of opening overpressures in excess of approximately 1 bar.

Two-part automatically opening and closing pressure relief valves are also known for lower opening and closing pressures. In the latter, the valve body is either pretensioned by its weight or its buoyancy and pressure against the valve seat, or the valve body itself is made elastic and mounted in such a manner that it is pressed against the valve seat by its own elasticity. The two-part valves in the first group cannot function independently of their position. The valve operates smoothly in only one very specific direction. The two-part pressure relief valves in the second group are usually designed either so that the valve body is an elastic flap which is tensioned on one side, and is pressed axially against the valve seat by virtue of its elasticity, or the valve body is made in the form of an elastic tube stretched over the valve seat, and is itself pretensioned radially by its own elasticity. This second group of two-part pressure relief valves has a specific manufacturing disadvantage. The junction of the valve with the overpressure side must be axial because of the tubular valve body, while the valve seat must be made radial. Hence, two bores must be provided, located and operating essentially at right angles to one another. Openings or channels are provided, which as a rule also require two independent work steps. In the manufacture of mass-produced products, however, each individual work step affects the cost.

The critical disadvantage of all two-part pressure relief valves whose valve bodies are made elastic and are self-pretensioned by virtue of their axially thin form and lateral tensioning lies in the contradictory nature of the requirements imposed on the material for such a valve body. The material required for such a valve body must be as dense, inflexible, rigid, wear-resistant, and abrasion-resistant as possible and must be capable of being worked so that it fits tightly. In the case of a rubber elastic material to yield to the impact of a valve body on the other hand, high elasticity is expected, which calls for a certain degree of softness, flexibility, and workability of the material. Material of this kind has a tendency toward high abrasion, jamming and adhesion, is highly gas-permeable in comparison to dense and rigid materials and, because of its elastic fatigue characteristics, lacks the required geometric dimensional accuracy and dimensional stability required for manufacturing flawless sealing lines and sealing surfaces. Because of these disadvantages, two-part pressure relief valves with a self-pretensioning valve body made of elastic material are used in practice only for relatively low opening pressures and even then have proved effective only in cases where they can be replaced rapidly and simply if necessary.

The problems of automatically opening and closing overpressure valves for mass production of very high quality products can be illustrated using the example of electrolytic capacitors.

Electrolytic capacitors are manufactured at the rate of several hundreds of thousands annually and are used in electrical equipment and installations. The capacitor itself and the electrolyte are enclosed in a can, usually made of aluminum, sealed in a leak-tight manner by a cover. Electrical, electrochemical or internal and external action of heat in electrolytic capacitors of the type described hereinabove can rapidly lead to the development of overpressures amounting to several bars. If no provision is made to release these overpressures, bursting of the sealed can can cause considerable damage to the installation in which it is installed. It is therefore conventional to equip electrolytic capacitors with overpressure valves.

The simplest and most appropriate pressure relief valve for this application is an ordinary rupture membrane. The bursting of this membrane, however, makes it necessary to replace the capacitor in order to keep the electrolyte from leaking out into the apparatus. However, this requires that the rupture of the membrane must be noticed in the first place. In addition, the electrolytic capacitor remains fully functional after the overpressure has been relieved (in at least 80% of all cases), so that it is not economical to replace an electrolytic capacitor (which is quite expensive, as a rule) merely because the membrane has burst. The workers familiar with capacitors therefore have already sought ways of making automatically opening and closing pressure relief valves. A valve of this sort should open approximately in the range between 5 and 10 bars and close in the range from 2 to 5 bars. For this purpose, three-part valves, in which the valve seat, valve body, and valve body tensioning means are made as separate components, has proved to be the best solution from the technical standpoint. However, this solution must be ruled out in the case of electrolytic capacitors for economy reasons.

German Offenlegungsschrift No. 23, 41, 375 teaches a two-part pressure relief valve of the type described hereinabove, with a radial valve seat, and a process for its manufacture. This valve has the undesirable features already described in detail above. The additional work step for the valve taught by this publication is the lateral slitting of a preformed housing dome to form the radial valve seat. The slitting device must be adjusted anew for each new can size. Slitting produces only rough valve seat surfaces, so that the entire dome shell acts as a sealing surface. This considerably increases the danger of leakage. Moreover, the housing dome must be made of a material which can be slit, and therefore cannot be made for example of a brittle injection-molded plastic. Finally the dome must be slit before installing the wire leads, regardless of whether this is desirable or not. Moreover, pulling a tight-fitting piece of elastic tubing over such a dome is a process step which is unsuited for mass production.

An automatically opening and closing pressure relief valve for an electrolytic capacitor with an axial valve seat is known from the German Offenlegungsschrift No. 23, 21, 166. The valve combines features of a two-part valve with those of a three-part valve. The valve seat is pre formed in the valve bore of the can lid of the electrolytic capacitor. The valve body is a circular disk with a central bore, made of elastic material. The outside diameter of the elastic valve body is larger than the inside diameter of the valve chamber formed in the can lid as a valve bore. The valve chamber is provided with a central bore and an axial passageway at the periphery; the upper opening of said passageway can be viewed as a valve seat. The valve body is depressed elastically by means of a pushbutton element which has a pretensioning effect and is pressed through the valve body and the central bore of the valve bore, with the edges turned upward, into the valve body. The inside edge of the valve body is thereby pressed in a sealing manner against a sealing lip by the pushbutton element. The automatically opening and closing over-pressure relief seal against the peripheral passageway is then provided mainly by the pressure of the valve body against the inside wall of the cylindrical valve housing. This valve body tensioning, exerting the pressure, is accomplished primarily by virtue of the material characteristics of the elastic valve body itself, said effect being intensified by the force produced by the pushbutton element. The opening of the valve response to overpressure is accomplished by elastic deformation of the valve body.

This embodiment of the valve requires the assembly of two individual parts, namely, the insertion of the valve body and the passing of the pushbutton element through it. Therefore, no significant assembly advantages are obtained with respect to three-part valves, although all of the disadvantages of the elastic design of the valve body still remain. Moreover, one of the two parts to be assembled, namely the pushbutton element, is not symmetrical. It must be held for assembly in such a way that the notched element is guided into the bore. This valve can therefore be assembled only by hand or at the price of very high-cost mechanical control. This embodiment of the pressure relief valve is therefore unsuitable for mass production, even though it has an advantage over the design for the known pressure relief valve described hereinabove, namely, that it can be made out of injection-molded plastic elements.

In view of this state of the art, the goal of the present invention is to make an automatically opening and closing two-part pressure relief valve, especially for the range of application for overpressures from 1 to 10 bars, which is so easy to manufacture and assemble that it is suitable for mass production and simultaneously ensures high sealing capacity and long service life.

To solve this problem, a two-part automatically opening and closing pressure relief valve is proposed, characterized according to the invention by a one-piece design of the valve housing, a valve seat, and an axially prestressed or pretensioned valve body urging means composed of (a) a deformable rubber-elastic or spring-elastic material combined with a rigid valve body, or (b) a dimensionally stable, rigid material combined with a deformable valve body of rubber or plastic, whose height vertical to the valve seat plane is at least 75% of its width parallel to the valve seat plane.

According to one embodiment of the invention, the valve housing preferably is made of a synthetic rubber mixture, which can also contain natural rubber components, and is characterized by a rotationally symmetric anti-pyramidal double truncated conical valve housing internal chamber with one end face which is completely open and an opposite end face which is completely closed. At least one passageway is provided in the closed end face, said passageway being located eccentrically, preferably peripherally. For smaller volumes of gas to be released at overpressure, this passageway is made in the form of a thin cylindrical bore. For higher blow-off volumes, several such passageways or a larger edge segment can be cut in the end wall. Care should be taken, however, to ensure that these end wall surfaces cover at least approximately 60% of the larger end surfaces of the parts of the double truncated cone of the internal chamber which open toward the wall. This unilaterally closed half of a double truncated cone, with the passageway in the end closure, forms the actual valve chamber and will be referred to as such hereinbelow. The valve body rests in the valve chamber in such manner that it is tensioned when the passageway between the end elastic wall of the valve chamber and the valve chamber cover, serving as the valve seat, is opened. The valve body is preferably made highly symmetrical and in particular has the shape of a sphere or a symmetrical dipyramidal double truncated cone. It is preferably made of glass, dealkylized glass produced by treatment with acid, quartz glass, hard plastic or metal.

Especially when the valve housing is made of rubber, the valve is is preferably installed coaxially with an opening in such manner that the inner surface of the opening fits firmly axially around the entire length of the outside surface of the valve housing. The valve housing can then be made in the form of a plug which can be pressed into the opening of a lid, which is then subsequently assembled to a container. Especially when using the valve in sealing covers for electrolytic capacitors, however, the valve housing is created by injecting the mass of rubber into the opening provided in the cover. A cover of this sort for cans for electrolytic capacitors is made of plastic, as a rule, preferably polyamide-6 or polyamide-6.6, usually reinforced with fiberglass, and provided with additional depressions or bores, intended to receive sealing material. These seals have the purpose of insulating the cover or the sealing disk from the can and the wire leads. According to a preferred embodiment of the invention, the valve housing for the pressure relief valve is formed simultaneously and in single work step with the other seals by the injection of a given mass of rubber into the corresponding recesses and/or bores. A firm bond to the sealing lid of the can is produced thereby. The only work step still required is the pressing in of the symmetrical valve body, which can be accomplished very simply and completely automatically.

In forming the valve housing by injection of the rubber mixture into the valve opening, the latter is preferably made so that it is provided along its axially outer end edges with axially projecting circumferential raised edges a few tenths of a millimeter high. These axially circumferential raised upper edges are preferably provided with a profile which tapers axially outward and serve to seal the opening against the shaping tool when the rubber mixture is injected. Corresponding raised edges can also be provided around the other recesses and bores which are injected with the rubber mixture in the same work step.

The injection of the valve housing makes it possible to shape the inside wall of the valve bore in a particularly efficient manner so that the valve housing, in addition to the already very strong material bond between the housing material and the cover material by the shaping of projections and recesses is protected against axial shifting in the valve hole or the valve bore.

In the elastic deformable form of the valve housing, the valve seat and the valve body tensioning means are manufactured in the one-piece manner according to the invention from a hard duroplastic or thermoplastic shaped by an elastic material shaping means, preferably by injection molding, or from a flexible steel sheet by deep drawing and hot pressing. The valve body is then pressed into the valve chamber, entering at the open valve housing side. The valve housing can be held in an opening by force-fitting or by screwing fastener devices. Alternatively, the valve housing can be reinforced in the area of the valve chamber and be provided with a male thread.

There has been described above a case in which the valve housing according to the invention is made of a deformable elastic material, such as rubber, elastic or spring steel, with a rigid valve body. According to the second embodiment, the goal of the invention is accomplished by the fact that the cooperation between the rigid and elastic material is reversed, in other words, the valve housing with the valve chamber, valve seat and the axial valve body tensioning means are made in one piece from a dimensionally stable and rigid material, while the valve body is made of an elastic deformable material. In contrast to the valve bodies which are rubber-elastic and are known from the state of the art, however, the axial height of the valve body is at least 75% of its radial width. Preferably, the height and width of the valve body are equal in the untensioned state. This ensures a much more reliable sealing and a longer service life for the valve according to the invention. Moreover, the valve body according to the invention, with a deformable elastic construction for producing axial pretensioning, is not radially tensioned; rather, the element which is made in one piece with the valve seat for tensioning the valve body is pretensioned exclusively axially, if there is disregarded the radial components acting on the valve seat itself. Even in this construction of the valve, the valve body is assembled by simply pressing it into the open side of the housing. In addition, the elastic valve body of the valve according to the invention is preferably made in the form of a ball.

This design for the valve according to the second embodiment of the invention is preferable, especially from the manufacturing standpoint, if the valve housing comprising the valve chamber, valve seat, and valve body tensioning means, can itself be shaped in and from the wall of the container or container part. This can be done without difficulty, especially when manufacturing injection-molded parts from plastic and cast parts made of metal. Also, the valve housing can be made preferably cylindrical on the outside, and can be provided over a portion or over the full height of the cylinder with a male thread, with which it can be screwed into an opening in the wall of the container or part of the container. Even in this embodiment the valve housing comprising the valve chamber, valve seat, and valve body tensioning means can be made of an injection-molded plastic product, especially a relatively hard and rigid duroplastic or thermoplastic, or can be made of metal.

However, both in the construction of the valve housing made of metal and in the construction of the housing made of plastic or of rubber or of another rubber-elastic material, assembly can be accomplished by flanging at one end. The valve housing is provided with molded flanges for such assembly.

Figure 1:
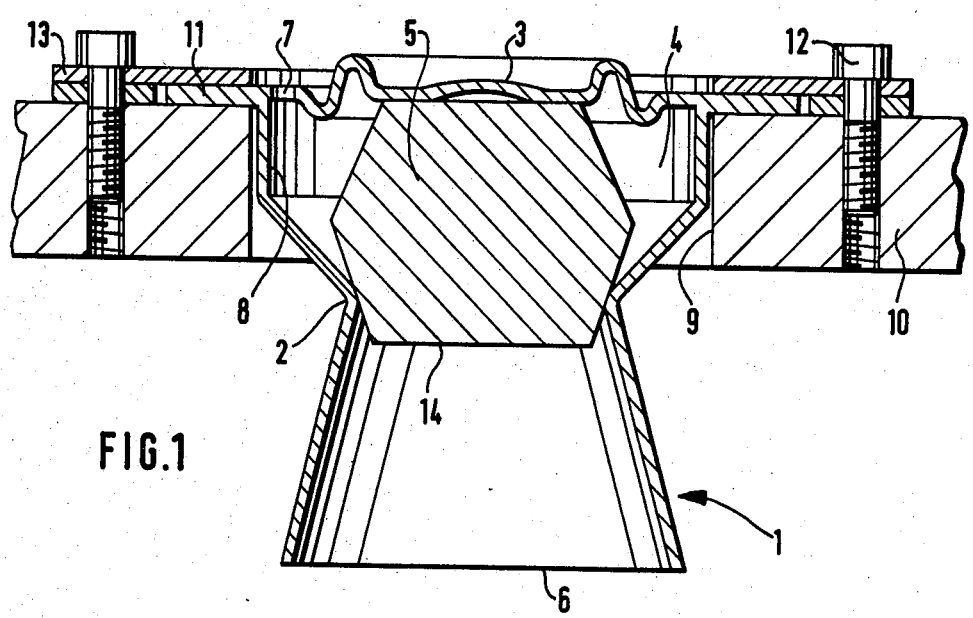
FIG. 1 is a cross section of an assembled valve according to a first embodiment of the invention, with a valve housing made of spring-elastic material.

In the embodiment of the invention shown in FIG. 1, the valve housing 1, the valve seat 2, and the valve housing tensioning means 3 are made in one piece from a thin spring-elastic steel sheet. Housing 1 is a circular transverse cross section. Valve seat 2 is formed by a radial constriction of the housing 1, with formation of a double conical internal wall surface. The upper part of the essentially opposed pyramid or double conical internal chamber of the valve housing provides the valve chamber itself, designated 4. In valve chamber 4 the dipyramidal double conical valve body 5 is between valve seat 2 and the valve body urging means 3, made in the form of the spring-loaded end wall of the housing 1, with axial stressing, i.e., pretensioning thereof. The valve body is made of hard rubber, a hard plastic, or preferably of metal. With larger dimensions of the valve, it can also be made in the form of a hollow body. Valve body 5 during installation through the open end 6 of the housing 1, is pressed against the spring-loaded resistance of valve seat 2 into valve chamber 4. The valve body is dimensioned so that is is pressed with axial pretensioning by valve body tensioning element 3 in a sealing manner against valve seat 2. It then rests against end face 3, which serves as the tensioning means, and leaves a vent opening 7, provided peripherally in the end face 3. The upper part 3' of valve chamber 4 is preferably made cylindrical, so that valve housing 1 with this cylindrical part can be pushed into a cylindrical valve bore 9 of a housing wall 10. A circular flange 11 is formed on housing 1 in one piece, said flange being fastened for example with studs 12, which are diagrammatically illustrated, and annular disk 13 in a sealing manner against vessel wall 10.

When an overpressure develops in the vessel, creating a force on the valve body 5 which is greater then the force thereon due to the axial pretensioning of end face 3 against valve seat 2, valve body 5, under the influence of the force from the overpressure on its bottom surface 14, is raised against the force of the spring tensioning of end face 3 and is lifted off valve seat 2. The overpressure is equalized by the escape of gas through the annular groove between rigid valve body 5 and valve seat 2, valve chamber 4, and vent opening 7. After the overpressure drops, valve body 5 is again pressed in a sealing manner by valve body tensioning means 3 against valve seat 2.

Figure 2:
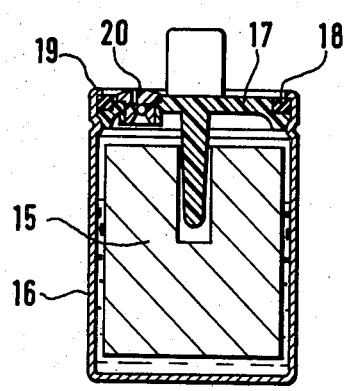
FIG. 2 is a cross section of a schematic representation of an electrolytic capacitor with a valve according to the invention, according to a further embodiment.
Figure 3:
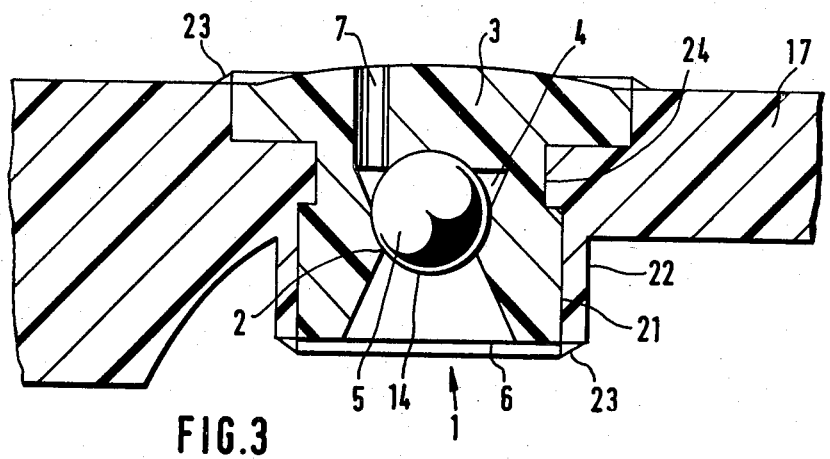
FIG. 3 is an enlarged partial representation of the valve according to FIG. 2.

Housing 1 can also be made of thermoplastic or duroplastic. A further embodiment of the invention is shown in FIGS. 2 and 3. FIG. 2 shows a lengthwise cross section of a schematic representation of an electrolytic capacitor whose electrodes 15 are inserted in a can 16 made of aluminum. Housing 16 is closed with a sealing lid 17 made of polyamide-6, said lid being provided with a circumferential marginal groove having injected sealant 18 therein. By turning can edge 19 over into seal 18, the interior of the housing filled with electrolyte is tightly sealed. A pressure relief valve 20 is provided in plastic sealing lid on the side. Pressure relief valve 20 is shown enlarged in FIG. 3.

Valve housing 1, which is made in one piece with valve seat 2 and and valve body tensioning means 3, is injected into valve housing opening 21 of plastic sealing lid 17 of the electrolytic capacitor. The rubber mixture for valve housing 1 of FIGS. 2 and 3 consists primarily of an ethylenepropylene-diene terpolymer rubber with the usual additives. The diene component is preferably 1,3-butadiene. Sealing lid 17 is reinforced in the vicinity of valve housing opening 21 by raised edge 22 in such manner that the axial length of the valve bore is equal to the axial length of valve housing 1. At the end, the edges of valve housing opening 21 are surrounded by circumferential raised edges 23, which have a shape which tapers axially outward when viewed in cross section, and have an axial height of fractions of a millimeter.

Similar raised edges also run around the other recesses and bores of sealing lid 17, which are likewise injected for sealing purposes with the same material from which housing 1 of the pressure relief valve of FIG. 3 is formed. The injected rubber mixture forms a firm bond with the plastic of the sealing lid. As a rule, valve housing 1 is held sufficiently firmly in sealing lid 17 thereby. For higher stresses, however, valve bore 21 is provided with an inwardly projecting collar 24, which serves for additional axial anchoring of the valve housing 1, in the sealing lid 17.

Valve housing 1 of FIG. 3 is provided with an open end 6 and a closed end 3, in which a passageway 7 is located eccentrically. The interior of valve housing 1 has the shape of a rotationally symmetrical double conical truncated cone, wherein the two parts of the truncated cone are located opposite one another in opposed-pyramidal fashion, in other words, in such fashion that their two larger base areas point outward at the ends and their two smaller base areas come together in the middle, as in FIG. 1. The upper truncated cone, closed off at the end by elastic housing wall 3, forms valve chamber 4, The lower truncated cone has its entire surface free and facing the inside of the can of the electrolytic capacitor. Valve chamber 4 is vented by means of an eccentrically positioned cylindrical passageway 7 in housing end membrane 3. With a larger exhaust volume, several such cylindrical passageways 7 or passageways with cross sections of different shapes, for example an annular passage may be provided.

Valve body 5 is a glass ball or a ball made of plastic. The spherical shape is perferred for the valve body, since its highly symmetrical form makes the valve simple to produce in mass production. To install a spherical valve body, the latter need not be placed in a special device, in advance of assembly, but requires a hopper.

The diameter of the ball is larger than the spherical space provided in the nonstressed state in the valve chamber. When pushing the sphere through opening 6 in housing 1 into valve chamber 4, valve chamber 4 is slightly deformed thereby. The restoring force of valve housing end wall 3 due to being elastically stressed pushes valve body 5 axially and in a sealing manner against valve seat 2. A further axial stressing or pretensioning component is also imposed on valve body 5 by the conical valve seat surfaces and the restoring force acting in the latter.

The axial stressing or pretensioning which acts upon valve body 5 is essentially a function of the material from which valve housing 1 is made and is also a function of the dimensions of the valve body and the thickness of the end sealing wall 3. In the embodiment shown in FIGS. 2 and 3 for the valve housing 1 injected into the sealing lid 17, the edge of the valve housing on the outlet side is shown rapidly enlarged, whereby the elasticity of end 3 is structurally increased.

As a rule, for setting the desired opening and closing pressures, making the radius of the valve body ball greater relative to the sphere which can be inscribed freely in the unstressed valve chamber space, making the membrane 3 thicker and making its radius smaller will result in greater opening and closing pressure of the valve. For a ball diameter of 20 mm, a thickness of the end wall membrane 3 of 14 mm and a maximum radius of the valve chamber truncated cone of 28 mm and a minimum diameter of the valve chamber truncated cone of 14 mm, the valve will open for example at an overpressure of 6 bars and close at an overpressure of 2.4 bars, if the rubber mixture used for manufacturing valve housing 1 has an average restoring force. A few simple tests will enable the expert to determine easily the required opening and closing pressures in an individual case by appropriate dimensioning and selection of the rubber mixture.

In the most economical case, the valve body ball consists of glass. Especially for cases in which there are objections to the tolerance of a normal alkali glass or alkaline earth glass to electrolytes, the valve body can also be made of glass which has been dealkalized in an acid bath of quartz, or of a hard, brittle plastic, preferably a thermoplastic. Metal balls, especially stainless-steel balls, are preferred for numerous applications.

The important advantage of the pressure relief valve shown in FIGS. 2 and 3 for electrolytic capacitors lies in its extraordinarily low manufacturing cost and simple assembly. Valve housing 1 is injected simultaneously (and in a single work step with the other sealing elements 18) into capacitor sealing lid 17. Then the ball is pressed completely automatically into the valve chamber which has open end 6 upward. The distributing device for the ball insertion mechanism can be a dispensing mechanism of very simple design. The ball falls into the funnel-shaped opening of the valve housing and is then forced into the valve chamber by gentle pressure from a rubber pusher. Thus, no valve hoses need to be stretched and carefully pulled over, nor do complexly shaped holding mechanisms need to be applied in certain directions.

Figure 4:
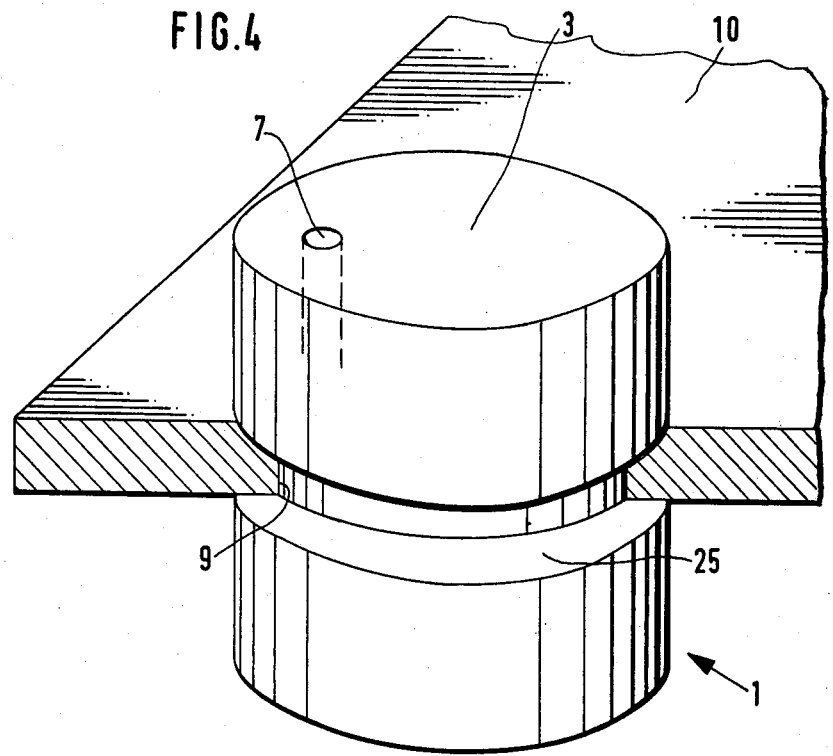
FIG. 4 is a perspective view, partially in cross section, of a valve of the type shown in FIG. 3, in a plug-type construction, mounted in the valve hole of a thin-walled container.

Another embodiment of the pressure relief valve according to the invention is shown in FIG. 4. Valve housing 1 likewise consists of a rubber-elastic material. In contrast to the construction shown in FIG. 3, the housing is not injected, however, but prepared in advance in the form of a plug. This valve, which is particularly suitable for installation in containers with very thin walls, especially containers made of sheet metal or thin-walled fiberglass-reinforced plastic containers, has essentially the shape shown in FIG. 3. In contrast to the injected valve housing, however, valve housing 1 in FIG. 4 has a circular cylindrical shape. The cylinder housing is provided in the center with a relatively deep annular groove 25, which accepts in a known fashion in a sealing manner the inside edge of the opening in thin wall 10. In the perspective drawing of the valve housing, shown in FIG. 4, the upper opening of passageway 7 to valve chamber 4 and the surface of the membrane pretensioning valve body can be seen. The interior of the valve housing shown is likewise made in the form of an anti-pyramidal double truncated cone. The valve body is a glass ball which, if circumstances permit, can also be inserted into valve hole 9 before valve housing 1 is inserted. Preferably, the ball, however, is inserted into valve hole 9 after valve housing 1 is installed. In this assembly sequence, valve housing 1 can be deformed more extensively when inserted into the opening and without any regard for the valve body. After installation, the valve chamber is in a completely non-tensioned state.

Annular groove 25 is preferably mounted either at the level of valve seat 2 or halfway up end housing membrane 3. In forming the annular groove, care must be taken to ensure that the remaining thickness of the rubber wall of the housing is made sufficiently strong at all points in order reliably to prevent gas diffusion, which must be taken into account.

The valve shown in FIGS. 2 and 3, made from an injected rubber housing, is preferably used for sealing lids, sealing disks, or sealing caps for cans or containers for electrolytic capacitors dry batteries or storage batteries. These sealing elements have a supporting element, which is made of plastic by injection molding or pressing. The plastic supporting element has recesses for the valve housing and to receive the sealing material, which seals off the wire leads from the sealing element, and the sealing element from the can or container. The valve housing and all the seals are made of the same rubber material and are injected simultaneously and in a single work step into the corresponding recesses in the plastic supporting element. All of the sealing elements and the valve housing, together with the plastic part, form an insoluble, solid, dense, one-piece bond. When injecting the rubber mass, the raised, pinched or crimped edges which are shown in FIG. 3 and run around the recesses prevent the injected rubber mass from overflowing onto the surface of the supporting element. The additional assembly cost required for installation of the automatically opening and closing pressure relief valve therefore consists solely and exclusively of the fully automatic installation of the valve body ball using the cheapest apparatus available.

The use of the valve is not limited to this application alone. By virtue of its extraordinarily simple structural form and its considerable flexibility of application, from both the material and structural standpoints, the valve according to the invention can be used in very different areas of technology, especially in the consumer goods area and the mass production area. The valve according to the invention can also be used as a highly efficient check valve. In particular, the valve seat must be made flatter and stiffer. Accordingly, a flatter valve body is likewise employed. In addition, the pretensioning of the valve body tensioning means, in other words housing membrane 3, need not be transmitted directly to the valve body, the tensioning can be accomplished by means of a ridge or a pin which is formed on the valve body. By providing a pin or ridge on surface 14 (FIG. 1) on valve body 5, the latter can also be raised by a lever system, so that the pressure relief valve can be opened mechanically by lever pressure and the container can be vented manually as well.

Figure 5:
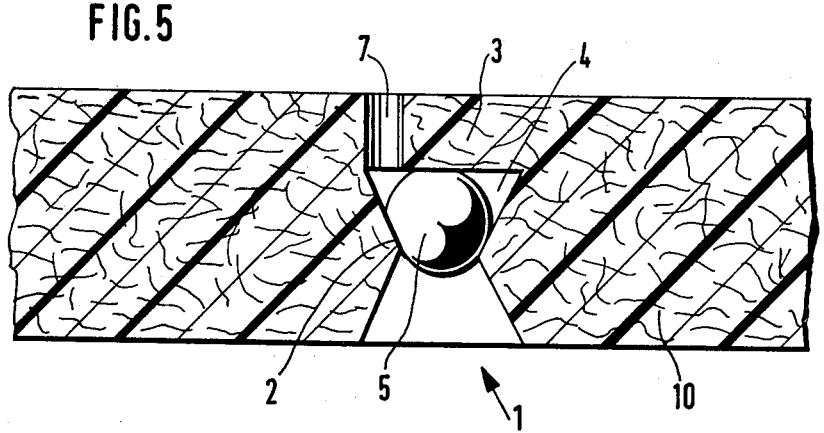
FIG. 5 is a cross section of a valve of the type shown in FIG. 3, but with an elastic valve body and a rigid housing.

A further embodiment of the invention, with a rigid valve housing and an elastic deformable valve body, is shown in FIG. 5. In container wall 10, for example the sealing lid of an electrolytic capacitor or the cover of a storage battery, valve housing 1 is made in one piece with valve seat 2, valve body tensioning means 3, the actual valve chamber 4, and ventilation channel 7. The forming of these elements in the wall of vessel 10 is particularly simple and economical if this vessel wall 10, for example the sealing lid, is made of plastic and is manufactured by injection molding. In making the sealing lids for electrolytic capacitors or storage batteries from injection-molded plastic, the preferred plastic is fiberglass-reinforced polyamide-6. After manufacture of vessel element 10, wherein valve housing 1 is formed simultaneously, in order to install the pressure relief valve it is simply necessary to press the deformable elastic valve body into the seat from the open end of the housing. Particularly when valve body 5, as shown in FIG. 5, consists of an elastic rubber ball, this assembly can be accomplished fully automatically and in the cheapest and simplest fashion.

I claim:

1. In combination, a sealing lid of plastic, a container subject to super-atmospheric internal pressure such as a capacitor or battery, said lid having a peripheral groove with elastomeric sealing material therein engaged by the container, said lid having a transverse opening therethrough, and a pressure relief valve molded directly in said opening comprising:

(a) a one piece valve housing of the same material as said sealing material, with the inner surface of the opening fitting firmly around the housing, the valve housing having an axial length substantially equal to the axial length of the opening, means defining a chamber in said housing including an annular valve seat, an axially opening conically upwardly flaring inlet communicating with said valve seat, an axially oriented outlet communicating with said chamber remote from said valve seat, and being eccentric relative to the axis of said valve seat, said chamber defining means comprising means defining a chamber surface conically outwardly flaring from said valve seat and means defining wall means being formed in one piece with said means defining said flaring chamber surface and generally parallel to the plane of said valve seat and spaced therefrom, (b) a spherical valve body in said valve chamber engaging an imperforate portion of said wall means and being partially embedded in said wall means, and engaging said valve seat when said valve is closed, (c) said wall means being elastically strained when said valve is closed and forcing said valve body against said valve seat, and (d) means for preventing axial shifting of said valve housing relative to said lid comprising an inwardly directed collar intermediate the ends of said opening engaging an annular recess in the housing, the surface of the opening and collar fitting firmly around the housing.

2. The combination of claim 1, said lid including a raised edge around the transverse opening and providing increased thickness of said lid at said opening.

3. In combination, a sealing lid of plastic, a container subject to super-atmospheric internal pressure such as a capacitor or battery, said lid having a transverse opening therethrough, and a pressure relief valve molded directly in said opening comprising:

(a) a one piece valve housing, the inner surface of the opening fitting firmly around the housing, the valve housing having an axial length substantially equal to the axial length of the opening, means defining a chamber in said housing including an annular valve seat, an axially opening concially inwardly flaring inlet communicating the container interior with said valve seat, an axially oriented outlet communicating the exterior with said chamber remote from said valve and being eccentric relative to the axis of said valve seat, said chamber defining means comprising means defining a chamber surface conically flaring from said valve seat and means defining wall means being formed in one piece with said means defining said flaring chamber surface and generally parallel to the plane of said valve seat and spaced therefrom and remote from the container interior, (b) a spherical valve body in said valve chamber engaging an imperforate portion of said wall means and being partially embedded in said wall means and engaging said valve seat when said valve is closed, (c) said wall means being elastically strained when said valve is closed and forcing said valve body against said valve seat to prevent flow of fluid from said container, and (d) means for preventing axial shifting of said valve housing relative to said lid comprising an inwardly directed collar intermediate the ends of said opening engaging a mating annular recess in the housing, the surface of the opening and collar fitting firmly around the housing.

4. In combination, a sealing lid of plastic with lead wires therein, a container subject to super-atmospheric internal pressure such as a capacitor or battery having a chemically aggressive liquid such as an electrolyte therein, the container being usable in an installation providing restricted access thereto, said lid having a transverse opening therethrough, and a pressure relief valve molded directly in said opening comprising:

(a) a one piece valve housing of a rubber material, the inner surface of said transverse opening fitting firmly around the housing, the valve housing having an axial length substantially equal to the axial length of the opening, means defining a valve chamber in said housing including an annular valve seat, an inlet communicating with said valve chamber, an outlet communicating the exterior with said valve chamber remote from said valve seat and being eccentric relative to the axis of said valve seat, said chamber defining means comprising means defining a chamber surface conically outwardly flaring from said valve seat and means defining wall means being formed in one piece with said means defining said flaring chamber surface and generally parallel to the plane of said valve seat and spaced therefrom, (b) a spherical valve body in said valve chamber engaging an imperforate portion of said wall means and being partially embedded in said wall means, and engaging said valve seat when said valve is closed, (c) said wall means being elastically strained when said valve is closed and forcing said valve body against said valve seat, and (d) means for preventing axial shifting of said valve housing relative to said lid.

5. The combination of claim 4, said lid having raised edges surrounding said transverse opening through said lid at the ends of said opening.

6. The combination of claim 4, said lid having a peripheral groove with elastomeric sealing material therein.

7. The combination of claim 4, said lid including a raised edge around the transverse opening and providing increased thickness of said lid at said opening.

* * * * *